United States Patent [19]

Clegg

[11] 4,333,713
[45] Jun. 8, 1982

[54] CONICAL BEAM CONCENTRATOR

[76] Inventor: John E. Clegg, 2320 Keystone Dr., Orlando, Fla. 32806

[21] Appl. No.: 260,583

[22] Filed: May 6, 1981

[51] Int. Cl.$^3$ ............................................. G02B 13/18
[52] U.S. Cl. .................................... 350/432; 126/440
[58] Field of Search ................ 350/432, 443; 126/438, 126/439, 440

[56] References Cited

U.S. PATENT DOCUMENTS 2,881,654  10/1955  Toffolo ............................... 350/432

Primary Examiner—John K. Corbin
Assistant Examiner—Rebecca D. Gass

[57] ABSTRACT

The disclosure is a multiple-stage optical instrument consisting of conical lenses which reduce the size of an incipient beam of light as a means of producing a high-intensity concentrated beam. The beam is composed of parallel rays of coherent light similar to the laser beam. The beam concentrator, however, is powered by sunlight, and it produces concentrated solar beams as a source of energy without using electricity.

Each stage of the beam concentrator consists of two component lenses; an upper lens with a planar section (face) which receives and transmits an incipient solar beam to a convex conical section on the opposite side of the lens, and a lower lens with a convex conical section which receives the beam refracted by the convex conical section of the upper lens and refracts the beam to a concave conical section on the opposite side of the lower lens. The beam is refracted three times and it emerges from the lower lens parallel to the incipient beam and concentrated 0.23 1/X, with 1/X denoting reduction in size. Any number of stages can be used, since the beams received and emitted are parallel. Moreover, the reduction in size is exponential. A three-stage concentrator, for instance, would reduce an incipient beam with a diameter of 82 mm to a concentrated beam with a diameter of 1 mm; 82 mm×0.23$^3$=1 mm.

1 Claim, 3 Drawing Figures

CONICAL BEAM CONCENTRATOR

BACKGROUND OF THE INVENTION

The invention relates to optical instruments, specifically to multiple-stage conical-lens concentrators which reduce the size and increase the intensity of solar beams.

Prior art includes the spherical magnifying lens which can be used to concentrate solar rays, and to the Conical Split-Image Microscopic Lens, U.S. Pat. No. 4,277,148, dated July 7, 1981, by the inventor. The effectiveness of the former is limited by the fact that it cannot produce parallel rays. The latter is similar to the disclosure in that it too consists of conical lenses and can be used as a concentrator by passing light rays through it in the opposite direction. It has three component lenses, however, and six sections (planar and concave conical, concave conical and convex conical, convex conical and concave conical) as opposed to two component lenses and four sections (planar and convex conical, convex conical and concave conical) of the disclosure.

SUMMARY OF THE INVENTION

The conical beam concentrator is unique in that it can produce high-intensity solar beams of coherent light without the use of electricity. It is also unique in that it can produce high-intensity beams of considerable diameters, such as nine centimeters and larger, for example. High-intensity beams of such widths can be used to smelt ores, melt rock and other opaque substances.

DESCRIPTION OF THE PREFERRED EMBODIMENT

Figure 1:
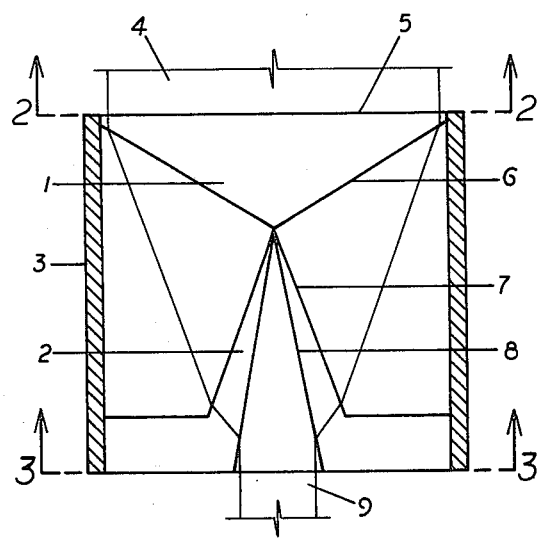
FIG. 1 is a longitudinal section of a one-stage beam concentrator.

FIG. 1 shows upper component lens 1 and lower component lens 2 mounted inside casing 3. Incipient beam 4 passes through planar section 5 and convex conical section 6 of upper component lens 1, and then through convex conical section 7 and concave conical section 8 of lower component lens 2, being refracted by the three conical sections 6-8 and emitted as concentrated beam 9.

Figure 2:
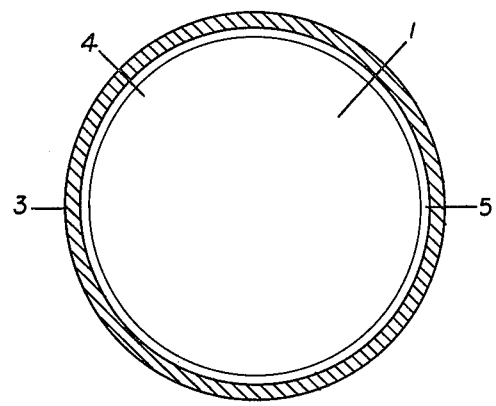
FIG. 2 is a cross section taken on line 2—2 of FIG. 1.
Figure 3:
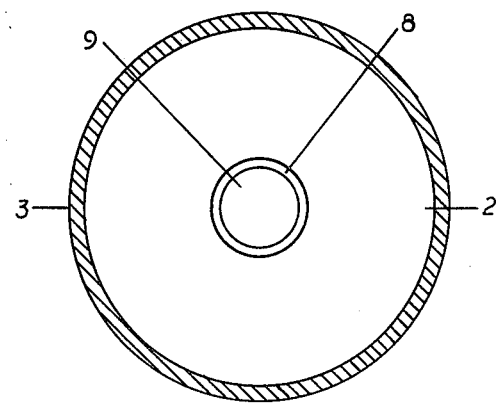
FIG. 3 is a cross section taken on line 3—3 of FIG. 1.

The cross section of incipient beam 4 is shown in FIG. 2, and the cross section of concentrated beam 9 is shown in FIG. 3. All surfaces of component lens 1 and 2 not used for the refraction or transmission of light rays are opaque.

The angles of incidence and refraction of the beam are as follows:

|  | $\theta_i$ | $\theta_r$ |
|---|---|---|
| Upper Component Lens 1 |  |  |
| Planar Section 5 | 0° | 0° |
| Convex Conical Section 6 | 31 | 50.6 |
| Lower Component Lens 2 |  |  |
| Convex Conical Section 7 | 50.6° | 31° |
| Concave Conical Section 8 | 41° | 80° |

Each stage of the beam concentrator reduces the beam by 0.23 1/X. Symbol 1/X denotes reduction of size as opposed to X which denotes enlargement or magnification of size. Enlargement of size of beams passing through the concentrator in the opposite direction is 4.33X; (0.23 = 1/4.33).

The inventor does not have access to data of the temperature of solar beams (BTUs per $cm^2$), but it is possible to give a rough indication of the temperature of concentrated beams by calculating their intensities, which are herein defined as the quotient of the area of the incipient beam divided by the area of the concentrated beam. The following table shows the diameters, areas and intensities of concentrated beams produced by a three-stage reduction of an incipient beam with a diameter of 180 cm.

| Stage | Beam Diameter | Beam Area | Beam Intensity |
|---|---|---|---|
|  | 180.0 cm | 25446.9 $cm^2$ | 1 |
| 1st | 41.6 cm | 1357.2 $cm^2$ | 18.8 |
| 2nd | 9.6 cm | 72.4 $cm^2$ | 351.6 |
| 3rd | 2.2 cm | 3.9 $cm^2$ | 6592.5 |

The concentrated beam produced by the 3rd stage would have an intensity of 6592.5. Obviously a beam of this intensity cannot be produced, even for a fraction of a second, without melting the lower lens of the 3rd stage.

The 2nd stage beam of intensity 351.6 can be produced, however. It can be used to smelt ores and melt rock, metals and other opaque substances. It can be used also to burn fuels which are noncombustible when exposed to ordinary heat. The 1st stage of the concentrator would be about six feet in diameter, the 2nd stage about sixteen inches, and the diameter of the emitted concentrated beam would be about four inches (9.6 cm).

The above calculations refer to incipient beams of full sunlight. It is possible to use hoods of darkened glass to reduce the intensities of the beams. Hoods will permit the use of the 3rd stage and also provide a means of controlling the intensities of emitted beams by allowing varying amounts of light to pass.

I claim:

1. A conical beam concentrator comprising an upper component lens mounted above a lower component lens inside a casing, with each component lens having one or two conical sections with surfaces which refract light rays at prescribed angles, with all conical sections being aligned on a common axis which is parallel to the light rays entering and exiting the component lenses, with all surfaces of the component lenses not used for the refraction and transmission of light rays being opaque;

(a) with the upper component lens having a planar section which receives parallel rays emanating from the sun, and a convex conical section which receives parallel rays transmitted from the planar section, (b) with the lower component lens having a convex conical section which receives parallel rays refracted by the convex conical section of the upper component lens, and a concave conical section which receives parallel rays refracted by the convex conical section of the lower component lens and which refracts the rays out of the lower component lens in a direction parallel to the common axis of the conical sections.

* * * * *

UNITED STATES PATENT AND TRADEMARK OFFICE
CERTIFICATE OF CORRECTION

PATENT NO. : 4,333,713

DATED : June 8, 1982

INVENTOR(S) : John E. Clegg

It is certified that error appears in the above-identified patent and that said Letters Patent is hereby corrected as shown below:

Column 1, the table beginning on line 60, in the heading, "8i    8r" should read    -- θi    θr --.

Signed and Sealed this

Twelfth Day of October 1982

[SEAL]

Attest:

GERALD J. MOSSINGHOFF

Attesting Officer    Commissioner of Patents and Trademarks